United States Patent [19]
Forrest et al.

[11] Patent Number: 6,076,644
[45] Date of Patent: Jun. 20, 2000

[54] CONICAL CLUTCH MEMBER HAVING RECESSED AREAS FOR USE IN A LIMITED SLIP DIFFERENTIAL

[75] Inventors: James L. Forrest, Ashley; Robert Leeper, Fort Wayne, both of Ind.

[73] Assignee: Auburn Gear, Inc., Auburn, Ind.

[21] Appl. No.: 09/092,830

[22] Filed: Jun. 5, 1998

[51] Int. Cl.[7] .............................. F16D 13/24; F16H 48/22
[52] U.S. Cl. .................... 192/66.2; 475/160; 475/234; 475/235; 192/113.36
[58] Field of Search .................................. 475/231, 234, 475/235, 240, 241, 160, 66.2; 192/70.15, 113.36, 48.8, 48.9, 48.91

[56] References Cited

U.S. PATENT DOCUMENTS

| | | | |
|---|---|---|---|
| 1,988,967 | 1/1935 | Emrick | 192/66.2 X |
| 3,327,563 | 6/1967 | Engle | 475/235 |
| 3,762,241 | 10/1973 | Roper | 475/240 |
| 3,815,443 | 6/1974 | McAninch et al. | |
| 3,964,346 | 6/1976 | Myers, Sr. | 475/234 |
| 4,169,394 | 10/1979 | Estrada | 475/234 |
| 4,269,086 | 5/1981 | Altmann | |
| 4,612,825 | 9/1986 | Engle | 475/235 |
| 4,815,337 | 3/1989 | Peloquin | 475/231 X |
| 5,226,861 | 7/1993 | Engle | 475/234 |
| 5,366,421 | 11/1994 | Hirota | 475/231 |
| 5,556,334 | 9/1996 | Fox | 475/234 X |
| 5,858,511 | 1/1999 | Lisowsky | 192/113.26 X |

FOREIGN PATENT DOCUMENTS

| | | |
|---|---|---|
| 0 379 721 | 1/1990 | European Pat. Off. . |
| 02286944 | 11/1990 | Japan . |
| 1 216 899 | 12/1970 | United Kingdom . |
| 2 188 382 | 9/1987 | United Kingdom . |

*Primary Examiner*—Charles A Marmor
*Assistant Examiner*—Ankur Parekh
*Attorney, Agent, or Firm*—Baker & Daniels

[57] ABSTRACT

A limited slip differential having at least one cone clutch element for frictionally engaging an interior surface of the rotatable differential casing. The cone clutch element has a plurality of clutch engagement surfaces which are disposed about the outside surface of the cone clutch element. Recessed areas are interposed between the clutch engagement surfaces.

31 Claims, 12 Drawing Sheets

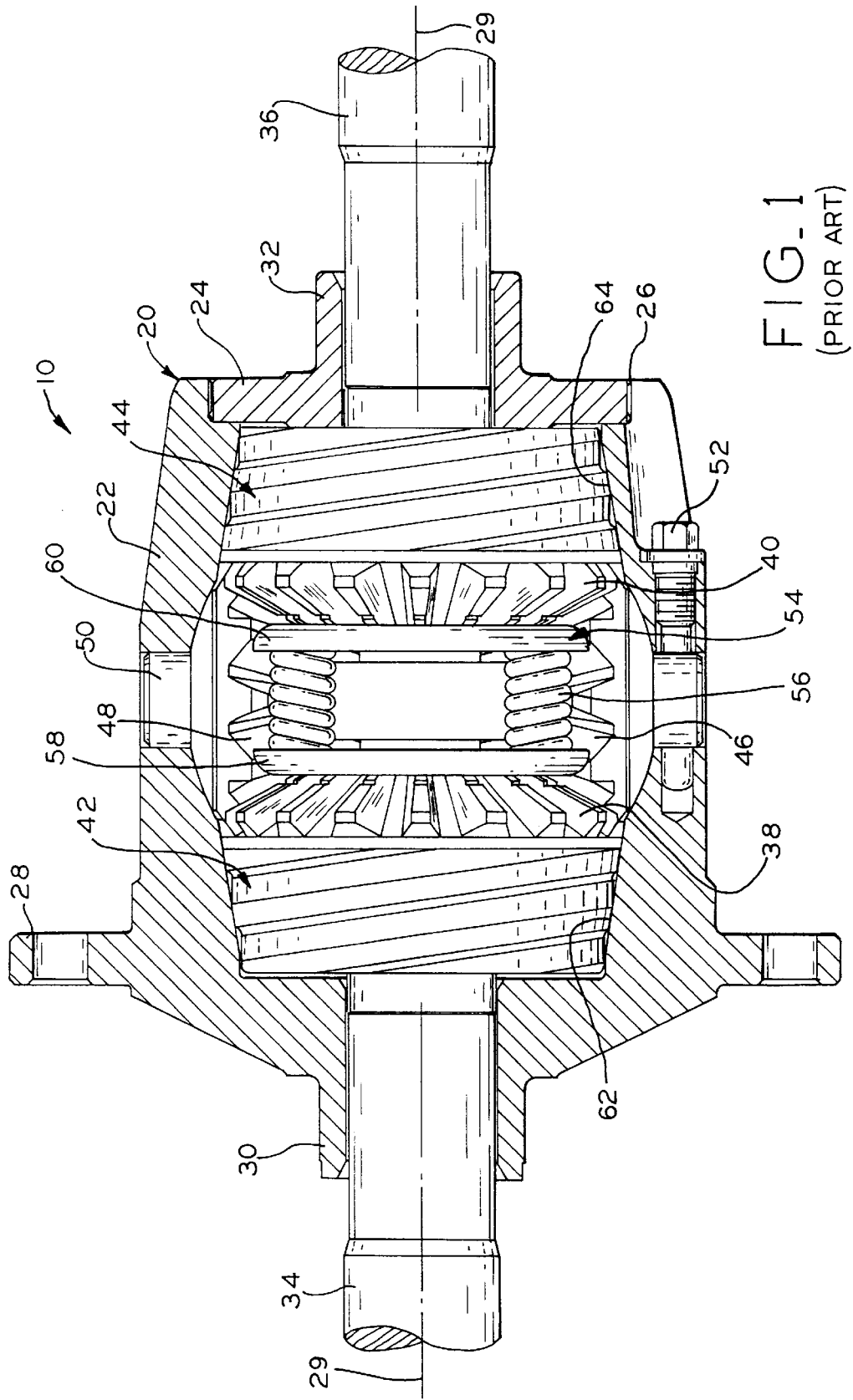
FIG_1 (PRIOR ART)

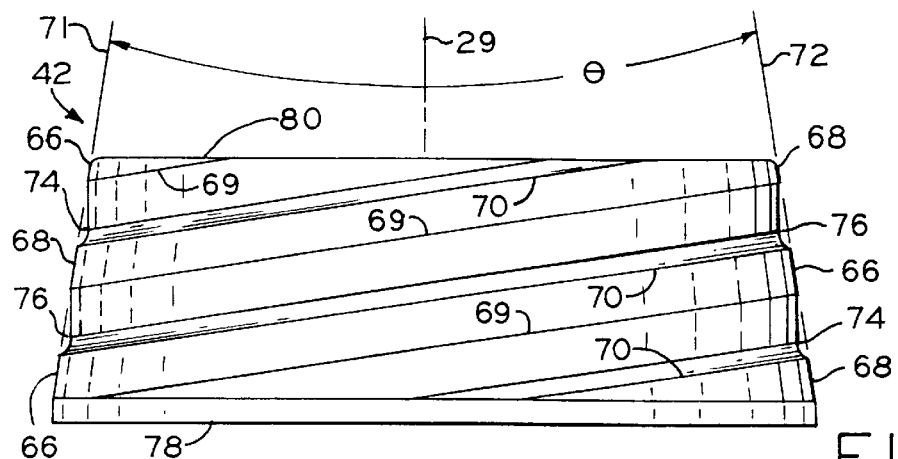
FIG._2 (PRIOR ART)
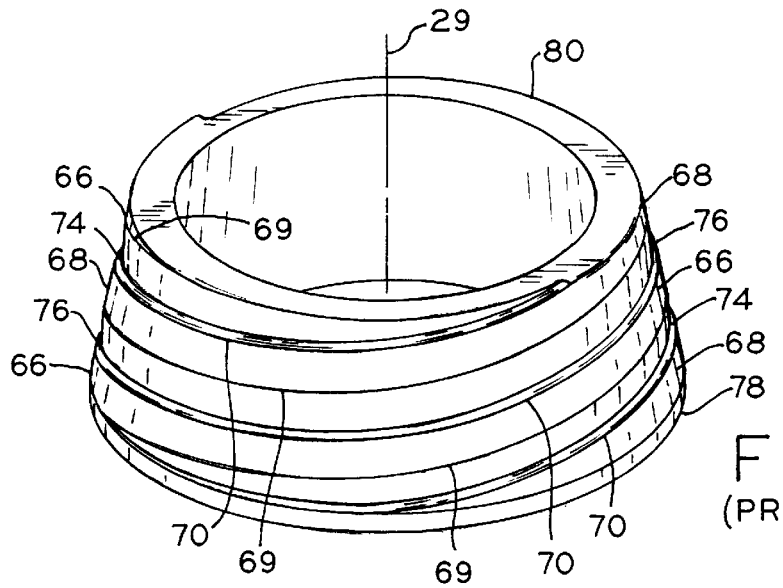
FIG._3 (PRIOR ART)
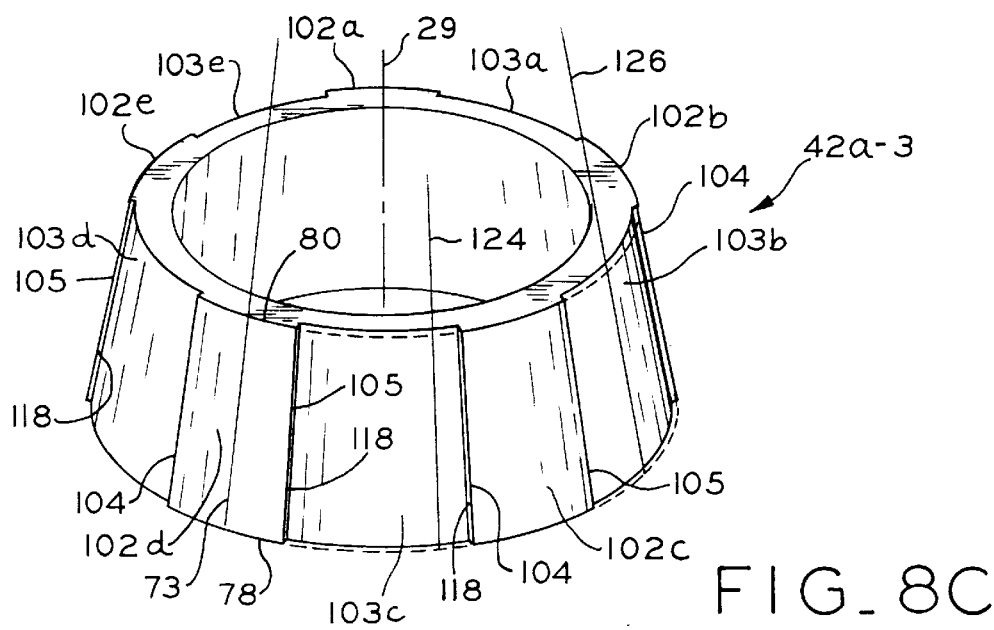
FIG._8C

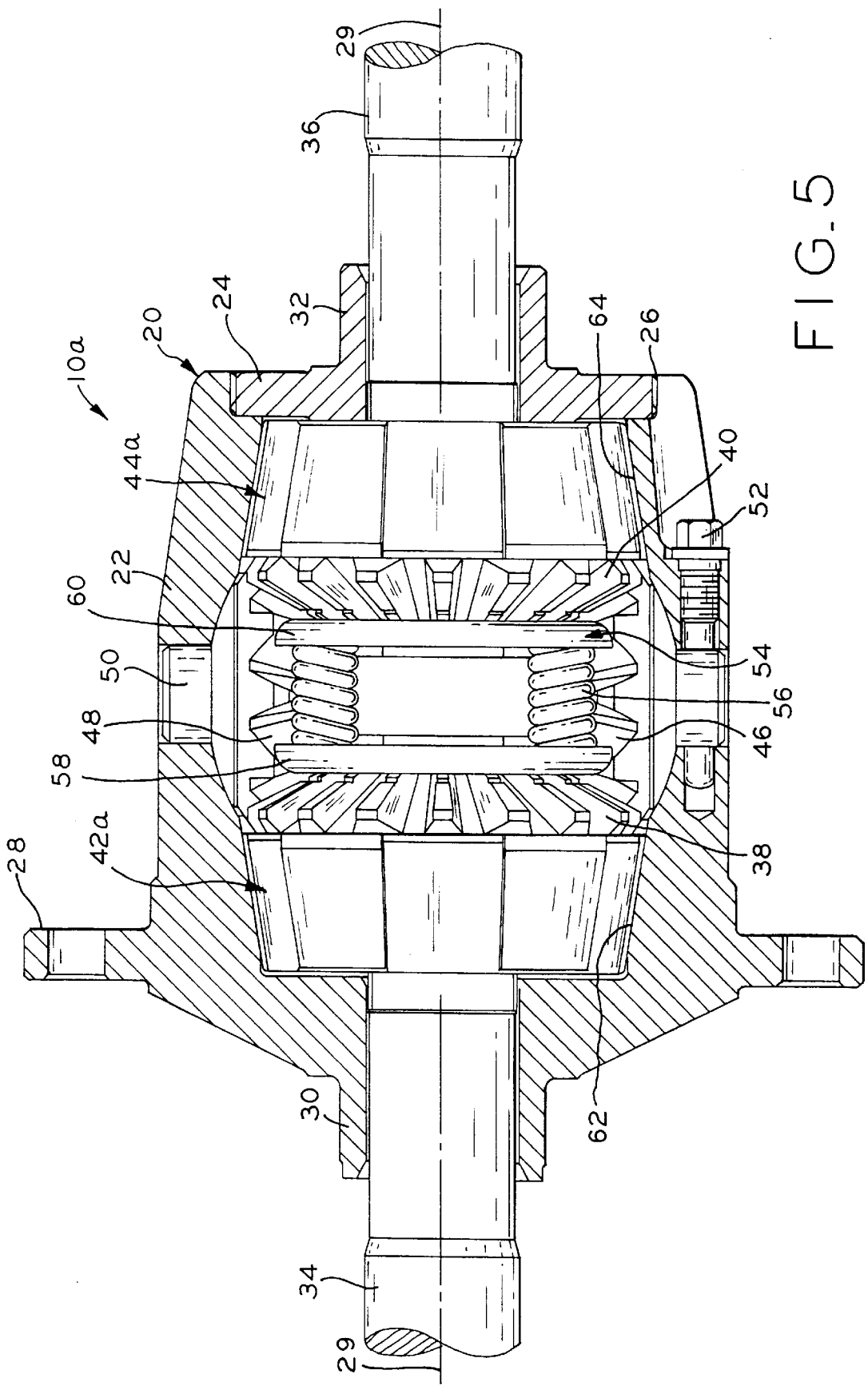

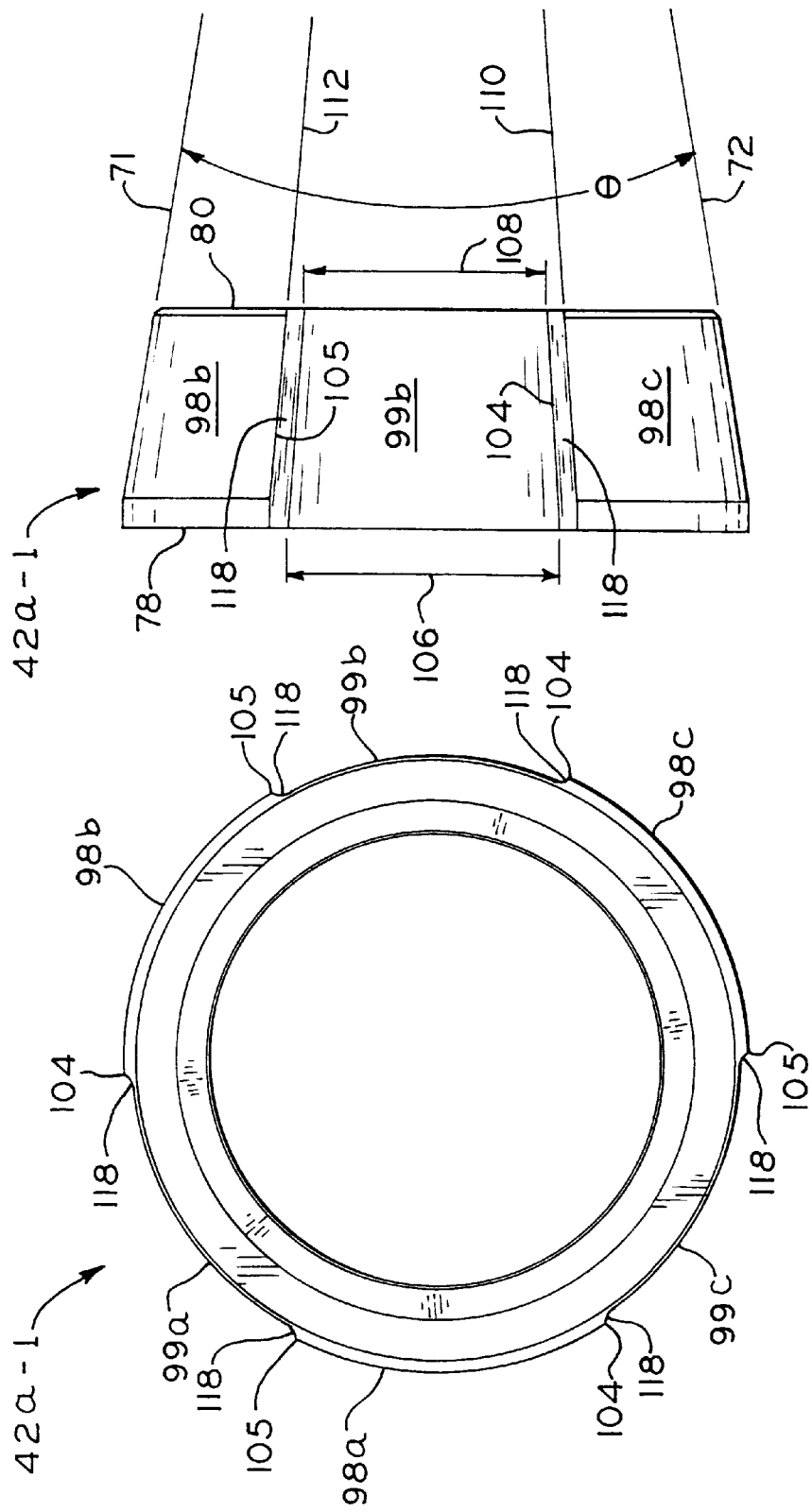

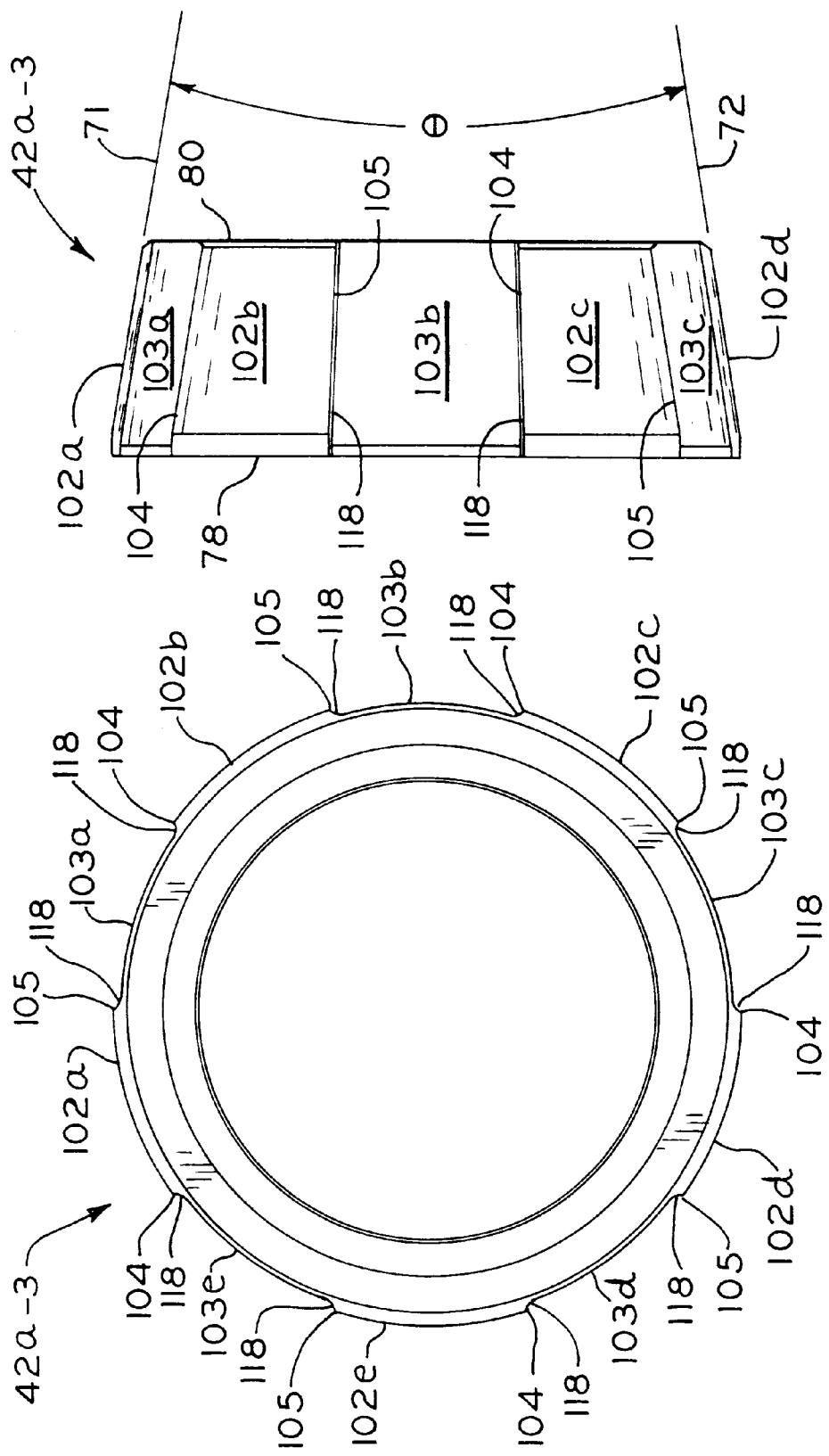
FIG_8B
FIG_8A

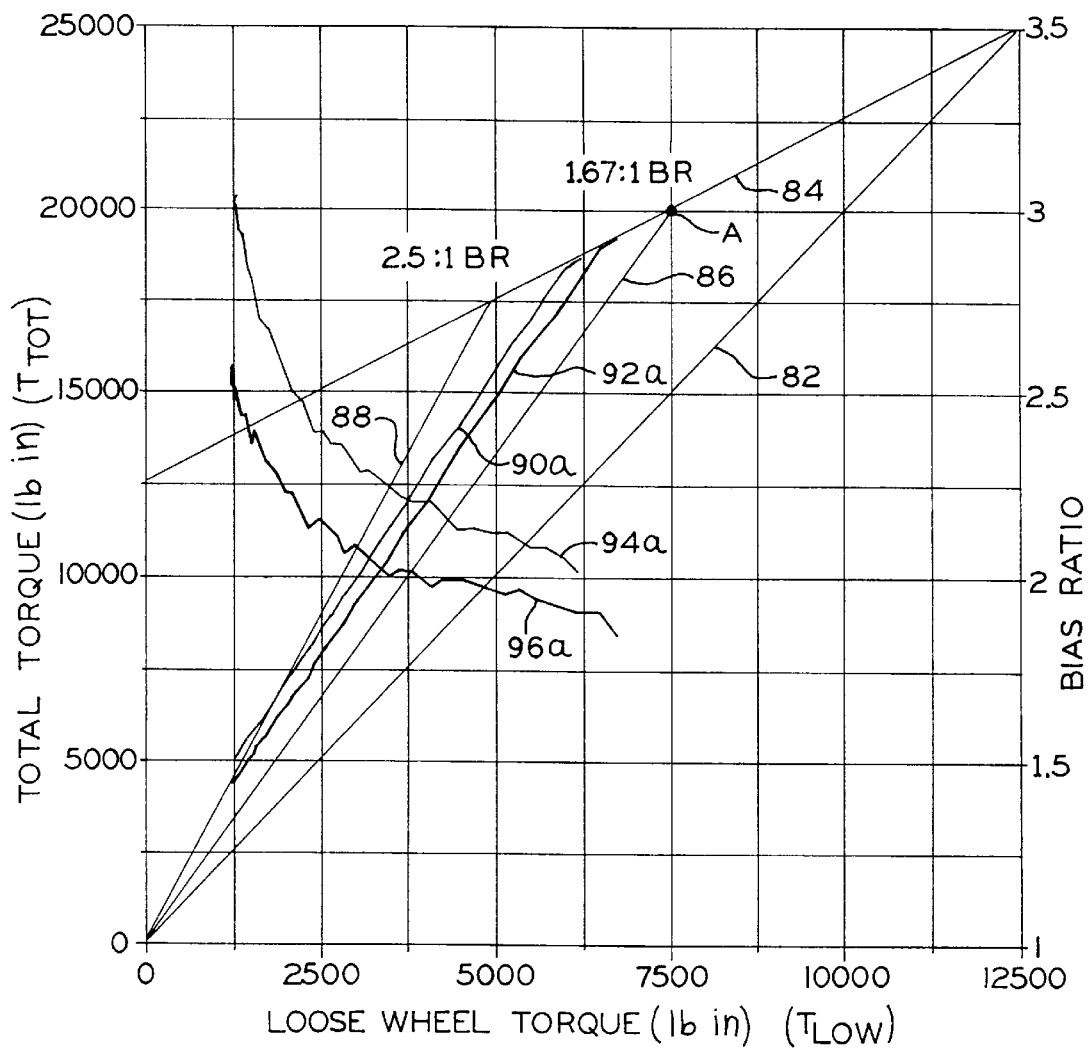
FIG_9

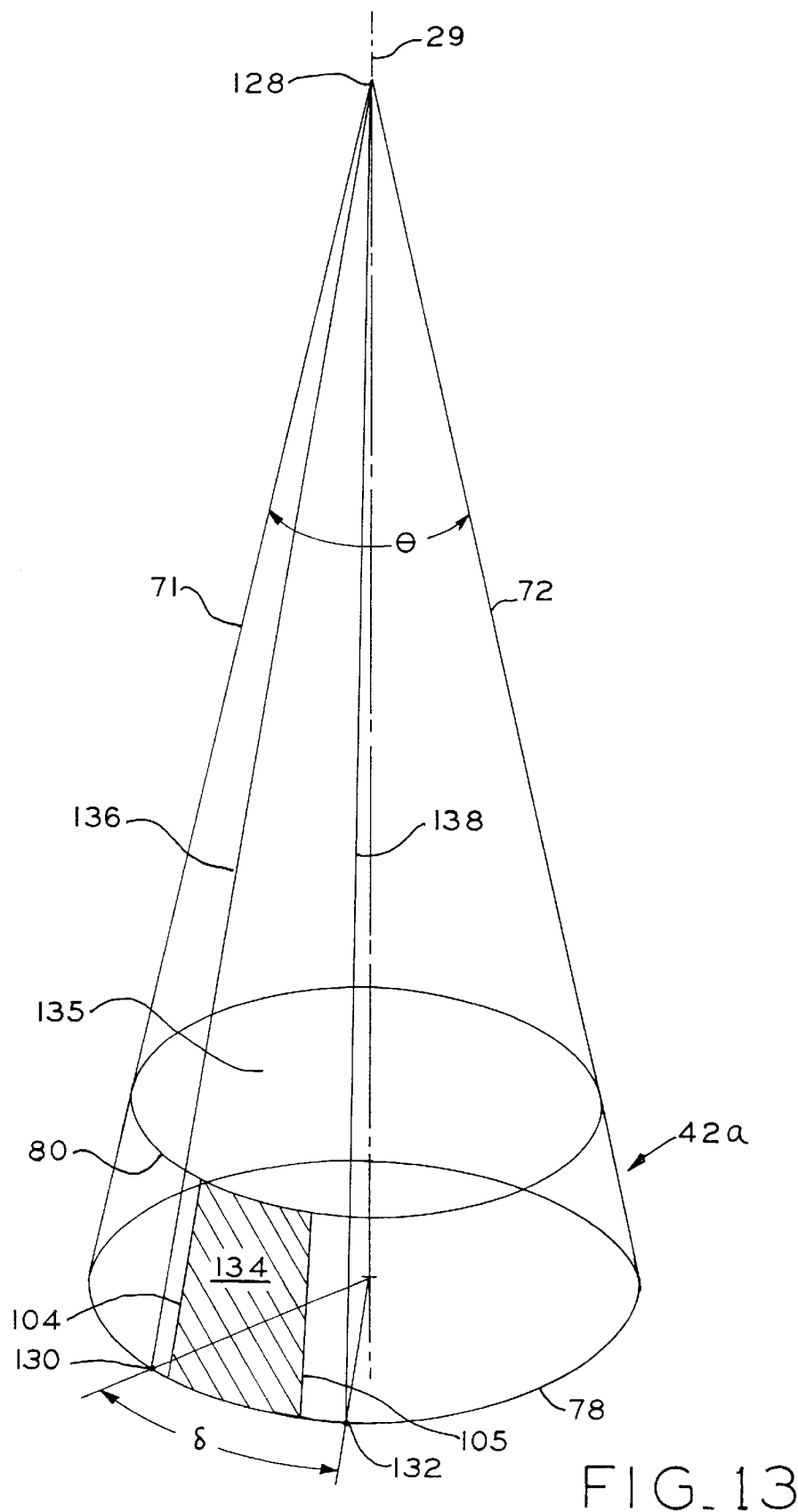
FIG_13

CONICAL CLUTCH MEMBER HAVING RECESSED AREAS FOR USE IN A LIMITED SLIP DIFFERENTIAL

BACKGROUND OF THE INVENTION

1. Field of the Invention

The present invention relates to differentials, and more particularly, to traction enhancing differentials having cone clutch elements.

2. Description of the Related Art

Differentials are well known in the prior art and allow a pair of output shafts operatively coupled to an input shaft to rotate at different speeds, thereby allowing the wheel associated with each output shaft to maintain traction with the road while the vehicle is turning. Such a device essentially distributes the torque provided by the input shaft between the output shafts. However, the necessity for a differential which limits the differential rotation between the output shafts to provide traction on slippery surfaces is well known.

The completely open differential, i.e., a differential without clutches or springs, is unsuitable in slippery conditions where one wheel experiences a much lower coefficient of friction than the other wheel, for instance, when one wheel of a vehicle is located on a patch of ice and the other wheel is on dry pavement In such a condition, the wheel experiencing the lower coefficient of friction loses traction and a small amount of torque to that wheel will cause a "spin out" of that wheel. Since the maximum amount of torque which can be developed on the wheel with traction is equal to torque on the wheel without traction, i.e. the slipping wheel, the engine is unable to develop any torque and the wheel with traction is unable to rotate. A number of methods have been developed to limit wheel slippage under such conditions.

Prior methods of limiting slippage between the side gears and the differential casing include use of a frictional clutch mechanism having a frusto-conical engagement structure and a bias mechanism, usually spring loaded, to apply an initial preload between the side gears and the differential casing. By using a frictional clutch with an initial preload a minimum amount of torque can always be applied to the wheel having traction, i.e. the wheel located on dry pavement. The initial torque generates gear separating forces which further engage the frictional clutch and develop additional torque.

The initial preload initiates the development of side gear separating forces which provide further braking action between the side gears and the differential casing. In general, gear separating forces are forces induced, due to the angle of contact or "pressure angle", on any set of meshing gears by the application of torque to the gears and which tend to separate the gears. In a differential, the development of torque will create side gear separating forces which tend to move the side gears away from the pinion gears. When one wheel is on a surface having a low coefficient of friction, the initial preload creates some contact and frictional engagement between the differential casing and the clutch mechanism disposed between the side gears and the differential casing to allow the engine to provide torque to the wheel having traction. This initial torque transfer induces gear separating forces on the side gears which tend to separate the side gears to further frictionally engage the clutch mechanism with the casing. The increased frictional engagement of the clutch allows more torque to be developed between the casing and the clutch element, thus further increasing the side gear separating forces and limiting the slippage between the side gears and the differential casing.

It is well known in the art to use frusto-conical clutch elements providing, on the outside surfaces thereof, a spiral structure which winds helically about the clutch element from its base to its tip, the tip comprising the annular edge resulting when the right circular cone is truncated at a plane parallel to its base, producing a frustum. The spiral structure provides a clutch engagement surface which frictionally engages an adjacent frusto-conical clutch interior surface of the differential casing. Generally, such cones are provided with a double helical structure, each helix beginning and ending at radially opposite points of the outside surface of the clutch element These frusto-conical clutch elements are made of generally ferrous material and are produced using powdered metal or machined casting methods.

FIG. 1 illustrates one embodiment of prior art limited slip differential 10 having helical cone clutch elements. Differential 10 comprises casing 20, which includes casing parts 22 and 24 which are assembled via threaded joint 26. Casing part 22 includes radial flange 28, to which a ring gear (not shown) is attached by, for example, threaded fasteners (not shown). Torque output from a vehicle transmission applied to the ring gear causes differential casing 20 to rotate about axis 29. Casing parts 22 and 24 are provided with hollowed hub portions 30 and 32, respectively, through which extend output shafts or axles 34 and 36 along longitudinal axis 29. Fixed for rotation with the end of each axle 34 and 36 in the interior of casing 20 are bevel side gears 38 and 40, respectively. In the embodiment shown in FIG. 1, each side gear 38 and 40 is fixed for rotation with cone clutch element 42 and 44, respectively, having the above mentioned double helical structure about their outside surfaces. Cone clutch elements 42 and 44 are usually identical and do not necessarily provide helical structures which spiral outwardly from the center of case 20 along axis 29 as mirror images of one another. Notably, other embodiments of limited slip differentials may provide only one cone clutch member.

Intermeshed with the teeth of side gears 38, 40 are pinion gears 46, 48. The pinion gears rotate about cross shaft 50 which extends therethrough and is attached to casing 20 to rotate therewith. Thus pinion gears 46, 48 rotate about cross shaft 50 and revolve about axis 29 with casing 20. Cross shaft 50 is usually retained to casing 20 with a fastener such as bolt 52. Disposed between the facing surfaces of bevel side gears 38, 40 is some form of preload mechanism 54. In the shown embodiment preload mechanism 54 comprises a plurality of compression springs 56 and bearing plates 58, 60. Bearing plates 58 and 60 bear on the facing surfaces of bevel side gears 38 and 40, respectively, urging them apart under the influence of springs 56. This separating force is imparted through the side gears to the cone clutch elements 42, 44, urging their outside frusto-conical surfaces into relatively light frictional engagement with mating frusto-conical clutch seat surfaces 62, 64 of the interior of casing part 22. When the wheels (not shown) attached to axles 34, 36 have equal traction, input torque to casing flange 28 is distributed approximately equally therebetween, transmitted from casing 20 to cross pin 50, to pinion gears 46, 48, to side gears 38, 40 and then to axles 34, 36, which generally rotate at the same speed as casing 20. Under this condition, little appreciable torque is transmitted directly from casing 20 to side gears 38, 40 and axles 34, 36 through cone clutch elements 42, 44 because the frictional engagement between clutch seat surfaces 62, 64 and cone clutch elements 42, 44 is generally rather light and minor clutch slippage is allowed when turning. However, as one of the wheels attached to axles 34, 36 loses traction, the two axles and the cone clutch elements fixed to rotate therewith begin to rotate at different speeds relative to each other and to rotating casing 20. Under this condition, separation forces acting between pinion gears 46, 48 and side gears 38, 40, plus the spring preload forces, in conjunction with the sliding relative motion between clutch elements 42, 44 and seat surfaces 62, 64, cause frictional torque transfer between cone clutch elements 42, 44 and casing surfaces 62, 64, braking the axle rotating faster than casing 20 and transferring torque from casing 20 to the slower moving axle.

FIG. 2 shows a typical embodiment of prior art frustoconical clutch element 42 (assumed identical to element 44) having, on its outside surface, helical structures providing two rather narrow, spiraling clutch engagement surfaces 66, 68 which coincide with a conic surface defined by imaginary element lines (two of which are represented by reference numerals 71 and 72) extending from base 78 of a right circular cone to its vertex 128 (FIG. 13). Each clutch engagement surface 66, 68 is bounded by a pair of spiraling, parallel lateral edges 69, 70. The prior art double helix cone clutch element of FIGS. 2 and 3 has spiraling clutch engagement surfaces 66, 68 begin at approximately radially opposite sides of base 78 and end at approximately radially opposite sides of tip 80. Each surface 66, 68 spirals approximately 360° circumferentially about the frusto-conical shape of element 42, with the full width of each surface 66, 68, i.e., the perpendicular distance between parallel lateral edges 69, 70, exposed over a circumferentially spiraling angle greater than 180° but less than 360°.

Lines 71 and 72, located on radially opposite sides of element 42, are typically separated by included angle θ ranging from about 10° to about 25°, depending on performance characteristics, with the smaller angle providing more aggressive clutch performance and the larger angle providing less aggressive clutch performance. It has been found that if the cone clutch angle is too small, there may be difficulty in releasing the clutch due to the wedging effect between the interengaging clutch surfaces and, if the cone clutch angle is too large, excessive preload pressure will be required to prevent slippage. Both surfaces 66, 68 of element 42 frictionally engage, in operation, mating clutch seat surface 62 in the interior of rotating casing part 22 (FIG. 1). Further, the helical structure of the outside surface of the shown clutch element provides two spiraling grooves or reliefs 74, 76 for channeling oil to and from the interfacing clutch surfaces. Examples of limited slip differentials employing such helically surfaced cone clutch elements are disclosed in U.S. Pat. Nos. 4,612,825 (Engle), 5,226,861 (Engle) and 5,556,344 (Fox), which are assigned to the assignee of the present invention and expressly incorporated herein by reference.

A limited slip differential's ability to transfer the torque which is applied to the rotatable casing to the axle shafts is characterized by its bias ratio (BR), which is defined as the ratio of the torque applied to the higher torque axle ($T_{high}$), i.e., the relatively slower spinning or nonrotating axle, divided by the torque applied to the lower torque axle ($T_{low}$), i.e., the faster spinning axle. The total torque ($T_{tot}$) transferrable from the rotating differential case to the axles equals the sum of the torque applied, equally or unequally, to each of the two axles. Thus, the bias ratio can be expressed as follows:

$$BR = T_{high}/T_{low} = (T_{tot} - T_{low})/T_{low} \qquad \text{(Equation 1)}$$

A higher bias ratio means that the two axles attached to the differential act more like a solid axle in that the differential is better able to transfer torque applied to the rotating casing unequally to each axle, for in a limited slip differential, the torque applied to the rotating casing tends to be transferred to each axle depending on the traction available at that axle's wheel. In contrast, an open differential, i.e., a differential having no limited slip feature, which has a theoretical bias ratio of 1:1, transfers the torque applied to the rotating casing to each axle equally, regardless of the traction available at each wheel.

With reference now to FIG. 4, a linear graph which utilizes typical values of torque along its left hand vertical and horizontal scales, straight line 82 represents the theoretical relationship between the torque applied to the loose wheel or lower torque (faster spinning) axle ($T_{low}$) on the horizontal scale and $T_{tot}$ for an open differential with the opposite axle fixed so as not to rotate, the "wheel" of the nonrotating axle thus having maximum traction. The theoretical bias ratio for an open differential being 1:1, each point on line 82 has a value of $T_{tot}$ which is twice that of $T_{low}$.

Straight line 84 represents the theoretical relationship between $T_{low}$ and $T_{tot}$ under the assumption that $T_{high}$ is held at a maximum value of 12,500 inch pounds, i.e., one half the 25,000 inch pounds total torque applied to casing 20. At each point on line 84, $T_{tot}$ equals $T_{low}$ plus 12,500 inch pounds ($T_{high}$). Line 84 thus represents a solid axle condition. A limited slip differential cannot transfer less torque than an open differential nor more torque than a solid axle. Therefore, between lines 82 and 84 is the total operating envelope for differentials, comprising a range of $T_{low}$ and $T_{tot}$ relationships for limited slip differentials which may be plotted linearly along lines stemming from the intersection of the ordinate and the abscissa, each such linear line representing a different bias ratio. For example, bias line 86 represents a bias ratio of 1.67:1 and bias line 88 represents a bias ratio of 2.5:1. It can be seen, therefore, that the slope of the bias line is determined by clutch effectiveness.

The operation of a theoretical limited slip differential will now be further explained with reference to FIG. 4: Bias line 86, representing a BR of 1.67:1, extends from point 0,0, at the intersection of the ordinate and the abscissa, to point A, where it intersects line 84. (It should be noted that if a clutch biasing mechanism such as preload mechanism 54 (FIG. 1) were provided in the example differential, straight line 86 would intersect the ordinate at a value higher than zero.) Along line 86, to the left of point A, the differential controls the distribution of torque $T_{tot}$ from the rotating casing to the non-rotating, "tight" wheel axle and the spinning, "loose" wheel axle. The amount of torque $T_{high}$ which may be applied to the tight wheel axle is limited to the maximum traction available to that axle's wheel which, in this example, is 12,500 pound inches. The loose wheel traction is, during testing, variably controlled by means of a brake to set the amount of loose wheel torque $T_{low}$.

At all points along line 86, the tight wheel axle has more traction available to it than is utilized, and the differential governs how much of the total torque $T_{tot}$ is transferred from the casing to the axles; in other words, the differential is still differentiating. For example, although the tight wheel has 12,500 pound inches of traction available to it, equation 1 can be used to reveal that at the point on line 86 where $T_{tot}$ is 10,000 pound inches and $T_{low}$ is 3750 pound inches, $T_{high}$ is only 6250 pound inches. At point A, where $T_{tot}$ is 20,000 pound inches and $T_{low}$ is 7500 pound inches, $T_{high}$ reaches the maximum traction level of the tight wheel of 12,500 pound inches.

As $T_{low}$ increases above 7500 pound inches, and $T_{high}$ exceeds the maximum traction level available to the tight wheel, the differential no longer controls the total amount of torque $T_{tot}$ transferred from the rotating casing to the axles, and bias curve 86 no longer applies; in other words, the differential stops differentiating. At values of $T_{low}$ beyond 7500 pound inches, both the tight and loose wheels spin, and relationship between $T_{tot}$ and $T_{low}$ follows curve 84 from point A onwards, simulating a solid axle in that each unit increment of $T_{low}$ is correspondingly added to $T_{tot}$. Thus, at points on line 84 to the right of point A, the amount of total torque $T_{tot}$ transferred from the casing to the axles depends solely on the amount of traction available to the loose wheel.

Because preloaded clutches are usually always engaged, they are susceptible to wear. And although frusto-conical, helical clutch elements as described above are initially effective in providing adequate clutched engagement, over repeated use that effectiveness degrades significantly, reducing the amount of torque which can be transferred between cone clutch element 42 and differential casing 20.

Referring again to FIG. 4, line 90 represents measured values of $T_{tot}$ for given $T_{low}$ values for limited slip differential 10 as shown in FIG. 1, having two double helical cone clutches as described above. The total area of clutch engagement surfaces 66, 68 is about 5.2 square inches per clutch element and the included angle θ between element lines 71, 72 is 25°. The data generating line 90 taken from a particular differential unit prior to durability testing. This same differential unit, after having undergone 400 miles of simulated highway driving with a normal sized tire and wheel attached to one axle and a mini-spare tire attached to the other, a condition designed to induce clutch slippage and thus burnish the clutch surfaces, produced the measured values of $T_{tot}$ for given $T_{low}$ represented by line 92. As can be seen, the bias ratio of this differential unit degraded appreciably through use. The right hand side of FIG. 4 has been scaled vertically to compare directly, through lines 94 and 96, the relationship between bias ratio and $T_{low}$ before and after durability testing, respectively. A comparison of lines 94 and 96 illustrates a substantial degradation in clutch performance over the operating range of $T_{low}$ values after the clutch surfaces have worn. This resulting reduction in the bias ratio may lead to undesirable repair and replacement costs. A limited slip differential with improved bias ratio durability is thus desirable, particularly if this improvement can be accomplished without substantially increasing variable cost, package size or weight. Thus, it is desired to provide this advantage with a cone clutch element which is directly interchangeable with element 42.

SUMMARY OF THE INVENTION

The present invention provides an improved cone clutch element for use in a limited slip differential as described above. Rather than providing a frusto-conical outer surface having spiraling engagement surfaces and oil channeling grooves, the inventive clutch element provides a plurality of smooth clutch engagement surfaces defining a frusto-conical shape and having a recessed area interposed between adjacent engagement surfaces.

Various embodiments of the present invention provide a cone clutch element having three, four and five clutch engagement surface sections defining a frusto-conical shape. Each of the recessed areas interposed between the clutch engagement surfaces generally conform to the area between a pair of element lines extending from the base of a right circular cone to its vertex, the cone being truncated at a plane parallel to its base to provide the frustum which generally defines the cone clutch element and which has a generally annular tip at its truncated end, opposite its base. The clutch engagement surfaces of a given embodiment of the inventive cone clutch element are generally equivalent in area and equally spaced about the outside periphery of the clutch element. The recessed areas extend between the tip and the base and provide channels for collecting oil which flows from between the interfacing clutch surfaces upon their engagement.

The cone clutch element of the present invention provides the advantage of increasing the durability of the bias ratio of a limited slip differential vis-a-vis prior cone clutch elements having a spiraling engagement surface and oil channeling groove. Furthermore, cone clutch elements according to the present invention may be directly substituted for prior, helical elements, and provide an improved differential for little or no increase in variable cost or weight.

The present invention provides a limited slip differential comprising a pair of axles rotatable about a first axis and a rotatable casing also rotatable about the first axis. At least one planet gear is rotatable about an axis perpendicular to the first axis, the planet gear revolving about the first axis. A pair of side gears are intermeshed with the planet gears, each side gear adapted to rotate with one of the axles. A clutch element is disposed between at least one axle and the casing, the clutch element adapted to rotate with the axle. The clutch element comprises a plurality of clutch engagement surfaces lying on a frusto-conical surface defined by a right circular cone having a vertex and a circular base. Each clutch engagement surface is bounded by at least one lateral edge and is completely contained within a surface of a right conic sector defined by two straight lines extending from the vertex to the circular base, the sector extending through an angle in the range of 0° to 180° about the base, the clutch element operable to frictionally engage at least one of the axles and the rotatable casing.

The present invention also provides a cone clutch element for a limited slip differential, the element comprising a plurality of clutch engagement surfaces lying on a frusto-conical surface defined by a right circular cone having a vertex and a circular base. Each of the clutch engagement surfaces is bounded by at least one lateral edge and is completely contained within a right conic surface sector defined by two lines extending from the vertex to the circular base, the sector extending less than 180° about the base.

The present invention further provides a limited slip differential comprising a pair of axles rotatable about a first axis and a rotatable casing also rotatable about the first axis. At least one planet gear is rotatable about an axis perpendicular to the first axis, the planet gear revolving about the first axis. A pair of side gears is intermeshed with the planet gears, each of the side gears adapted to rotate with one of the axles. A generally frusto-conical clutch element is defined by a right circular cone having a base and a vertex, the clutch element disposed between at least one bevel gear and the casing for frictionally engaging the bevel gear and the casing, and adapted to be rotated with the bevel gear. The clutch element comprises a plurality of discrete clutch engagement surfaces separated by nonengagement portions, the clutch engagement surfaces and the nonengagement portions generally arranged to extend from the base in the direction of the vertex.

The present invention also provides a limited slip differential comprising a pair of axles rotatable about a first axis and a rotatable casing also rotatable about the first axis. At least one planet gear is rotatable about an axis perpendicular to the first axis and revolves about the first axis. A pair of side gears is intermeshed with the planet gears, each of the side gears adapted to rotate with one of the axles. A clutch element is disposed between at least one axle and the casing, adapted to be rotated with the axle and operable to frictionally engage at least one of the axles and the rotatable casing. The clutch element further comprises surface means for frictionally engaging an interior surface of the rotatable casing.

The present invention also provides a limited slip differential comprising a pair of axles rotatable about a first axis and a rotatable casing also rotatable about the first axis. At least one planet gear is rotatable about an axis perpendicular to the first axis and revolves about the first axis. A pair of side gears is intermeshed with the planet gears, each of the side gears adapted to rotated with one of the axles. A clutch element is disposed between at least one axle and the casing, adapted to be rotated with the axle. The clutch element comprises a plurality of clutch engagement surfaces lying on a frusto-conical surface defined by a right circular cone having a base and a vertex. Each clutch engagement surface is bounded by lateral edges. A line extending from the base to the vertex in one of the clutch engagement surfaces is disposed between at least two of the lateral edges of the clutch engagement surface. The clutch element is operable to frictionally engage at least one of the axles and the rotatable casing.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein:

FIG. 1 is a sectional side view of one embodiment of a prior art limited slip differential using cone clutch elements having two spiraling engagement surfaces and oil channeling grooves provided on the outside surface thereof;

FIG. 2 is a side view of a cone clutch element of the differential of FIG. 1;

FIG. 3 is a perspective view of the cone clutch element of FIG. 2;

FIG. 5 is a sectional side view of one embodiment of a limited slip differential according to the present invention;

FIG. 6A is an end view of one embodiment of a cone clutch element according to the present invention;

FIG. 6B is a side view of the cone clutch element of FIG. 6A;

FIG. 8A is an end view of yet another embodiment of a cone clutch element according to the present invention;

FIG. 8B is a side view of the cone clutch element of FIG. 8A;

FIG. 8C is a perspective view of the cone clutch element of FIG. 8A;

FIG. 9 is a graph illustrating the relationship between the total torque applied by the differential casing to the axles and the torque applied to the axle having the lower torque, and the relationship between the bias ratio and the torque applied to the axle having the lower torque, for the differential of FIG. 5 having two frusto-conical clutch elements as shown in FIGS. 8A–8C, before and after durability testing;

FIG. 13 is a partial schematic of a cone clutch element according to the present invention.

Figure 4:
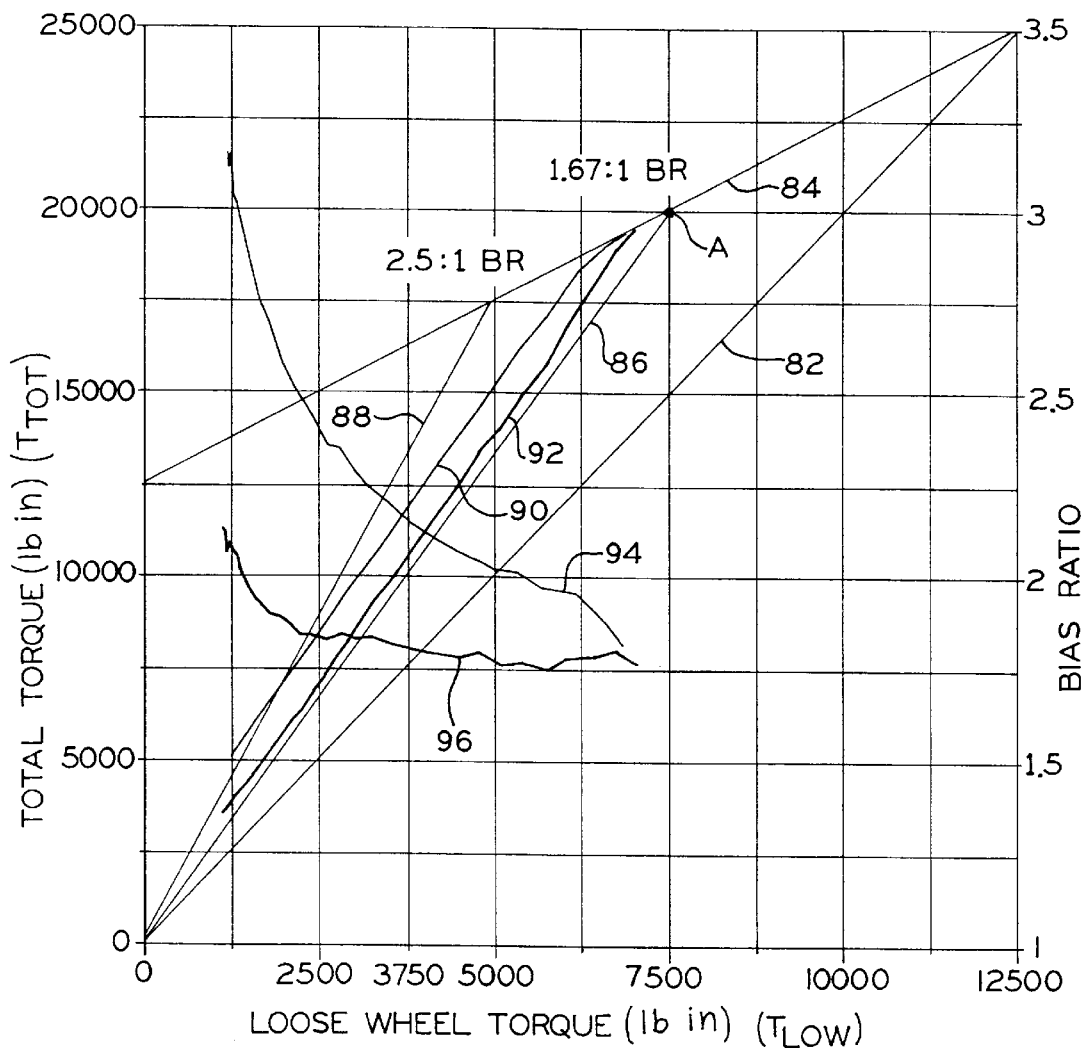
FIG. 4 is a graph illustrating the relationship between the total torque applied by the differential casing to the axles and the torque applied to the axle having the lower torque, and the relationship between the bias ratio and the torque applied to the axle having the lower torque, for the differential of FIG. 1, before and after durability testing.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in alternative forms, and such exemplifications are not to be construed as limiting the scope of the invention in any manner.

DETAILED DESCRIPTION OF THE INVENTION

The embodiments disclosed below are not intended to be exhaustive or limit the invention to the precise form disclosed in the following detailed description. Rather, the disclosed embodiments are chosen and described so that others skilled in the art may be able to make and use the present invention.

FIG. 5 shows one embodiment of limited slip differential 10a according to the present invention. Differential 10a comprises inventive cone clutch elements 42a and 44a, but is otherwise identical in design and construction to previously known differential 10 shown in FIG. 1. Although differential 10a is shown to include two cone clutch elements, it is to be understood that limited slip differential embodiments having only one cone clutch element according to the present invention are considered to be within the scope of the present invention. Moreover, although it is envisioned that where two cone clutch elements according to the present invention are used, those elements will normally be identical, that is not necessarily the case. However, for purposes of clarity, reference below to inventive cone clutch element 42a and any of its embodiments should be understood to refer to inventive cone clutch element 44a as well.

Referring to FIGS. 6A and 6B, a first embodiment of inventive cone clutch element 42a is shown, designated with reference numeral 42a-1. This embodiment comprises three clutch engagement surface segments 98a, 98b, 98c of approximately equal area and generally disposed equally about the outside surface of element 42a-1. Interposed between clutch engagement surface segments 98a–c are recessed areas 99a, 99b, 99c.

Figures 7A, 7B:
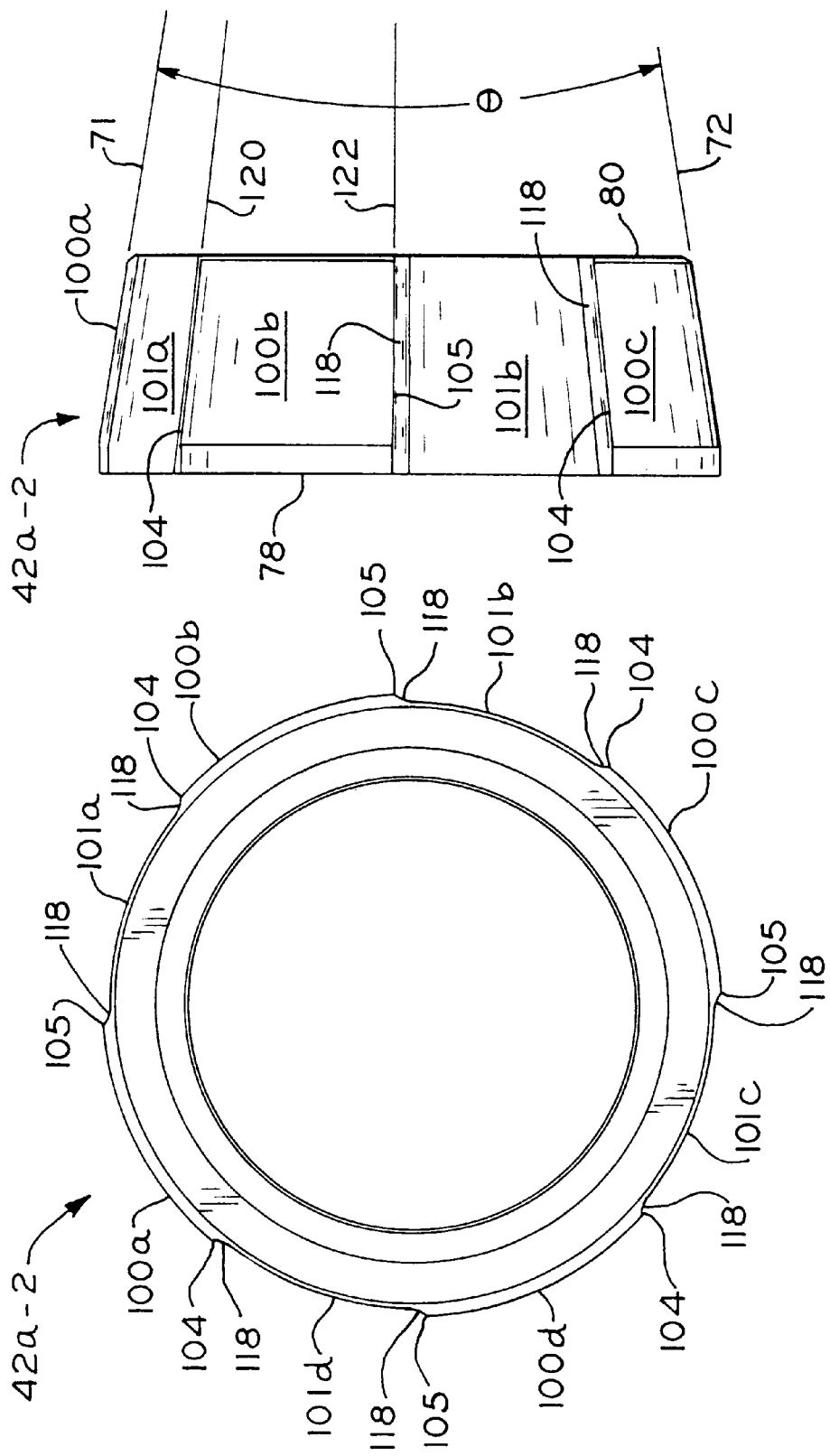
FIG. 7A is an end view of another embodiment of a cone clutch element according to the present invention.
FIG. 7B is a side view of the cone clutch element of FIG. 7A.

Referring to FIGS. 7A and 7B, a second embodiment of a cone clutch element according to the present invention is shown, designated with reference numeral 42a-2. This embodiment comprises four clutch engagement surface segments 100a, 100b, 100c, 100d of approximately equal area and generally disposed equally about the outside surface of element 42a-2. Interposed between clutch engagement surface segments 100a–d are recessed areas 101a, 101b, 101c, 101d.

Similarly, referring to FIGS. 8A and 8B, a third embodiment of a cone clutch element according to the present invention is shown, designated with reference numeral 42a-3. This embodiment comprises five clutch engagement surface segments 102a, 102b, 102c, 102d, 102e of approximately equal area and generally disposed equally about the outside surface of element 42a-3. Interposed between clutch engagement surface segments 102a–e are recessed areas 103a, 103b, 103c, 103d, 103e.

In each of these three embodiments of inventive cone clutch element 42a, the total engagement surface area approximates that of prior art cone clutch element 42, which includes the areas of spiral engagement surfaces 66 and 68 and totals about 5.2 square inches per clutch element. Also, the total recessed area of each embodiment of inventive cone clutch element 42a is generally equivalent to its total engagement surface area. Thus, the sum of areas of surfaces 98a–c, the sum of areas of surfaces 100a–d, and the sum of areas of surfaces 102a–e are equivalent to the sum of the areas of spiraling surfaces 66 and 68, as are the sum of recessed areas 99a–c, the sum of recessed areas 101a–d and the sum of recessed areas 103a–e. Further, it has been found that establishing the recessed area at a generally constant depth of approximately 0.040 inch below the frusto-conical surface defined by the clutch engagement surfaces performs well, although it is believed that deeper recessed area depths should work as well. Providing recessed areas at depths of less than 0.040 inch may perform satisfactorily, but may require use of a lubricant having less viscosity than typically used in such differentials.

In the shown embodiments of cone clutch elements 42 and 42a, the clutch engagement surfaces conform to the surface of a right circular cone having element lines which extend from its base to its vertex. Two of these element lines are represented by lines 71 and 72, which intersect radially opposite points on the circular cone base and are shown in FIGS. 2, 6A, 7A and 8A. Generally, angle θ between lines 71 and 72 ranges from 10° to 25°, and prior art cone clutch element 42 and inventive cone clutch element 42a must share a common angle θ to be compared or substituted. Similarly the heights of elements 42 and 42a, as defined as the axial distance between base 78 and tip 80, must be common for comparison or substitution purposes. Element 42a is adapted to mate with bevel side gears 38, 40 in the same way as does element 42 and thus element 42a may be interchangeably packaged in differential casing 20 as a substitute for element 42. Moreover, as is the case with previous cone clutch element 42, cone clutch element 42a is made of generally ferrous material and produced using powdered metal or machined casting methods. Therefore, differences in variable cost and weight between differentials 10 and 10a are expected to be negligible.

In each embodiment of cone clutch element 42a, the surface profile of each clutch engagement surface, viewed from the edge of base 78 towards vertex 128 (FIG. 13) of the cone along an element line such as 71 or 72, is substantially convex. Also, referring to FIGS. 6A–8B, it can be seen that each clutch engagement surface segment terminates, at its lateral sides, with nonchamfered edges 104, 105. As clutch element 42a rotates relative to casing 20, leading edge 104 or 105 is believed to push excessive lubricating oil from casing clutch seat surfaces 62, 64 during unclutched operation of differential 10a when cone clutch element 42a is in light frictional contact with surfaces 62, 64, the oil being displaced into the recessed areas of the cone clutch element. Oil is allowed to flow unobstructedly in and out of the recessed area of element 42a through their open ends at base 78 and tip 80. During engagement of the clutch, as cone clutch element 42a is brought into sliding contact with relatively rotating seat surfaces 62, 64, leading edge 104 or 105 is believed to squeegee substantially all of the oil from those surfaces, precluding hydrodynamic "floating" of the clutch surface segments on surfaces 62, 64 during intended clutch operation. It has been found that filleting transition surface 118, i.e., providing a concave joint between edges 104, 105 and the adjacent recessed area, is sufficient to achieve desired results and it is believed that providing any profile to transition surface 118 which preserves the nonchamfered characteristic of edges 104, 105, e.g., angled or squared, will be satisfactory.

Referring now to FIG. 6B in particular, it is shown that width 106 of recessed area 99b at base 78 is greater than its width 108 at tip 80. This is the result of element lines 110 and 112, which extend along edges 104 and 105, respectively, on opposite lateral sides of a given recessed area, converging as they progress from base 78 to cone vertex 128 (FIG. 13) Alternatively, it is contemplated that widths 106 and 108 may be equivalent, in which case element lines 110 and 112, which are coincident with edges 104, 105 on opposite lateral sides of a given recessed area, e.g., 99b, would be parallel rather than converging as shown. Referring now to FIG. 7B, a second alternative would provide that element lines 120 and 122, which extend along edges 104 and 105, respectively, on opposite lateral sides of a given clutch engagement surface segment, e.g., 100b, would be parallel rather than converging as shown. It is further contemplated that adjacent straight lateral edges 104, 105 may be neither parallel nor both converging to a common vertex point, and still further contemplated that lateral edges 104, 105 may instead be curved. In any case, element lines 71 and 72 would, of course, maintain their original orientation, the clutch engagement surface segments still defining the frusto-conical shape. By analogy, this aspect of the present invention is attributable to its other shown embodiments. Thus it is contemplated that the scope of the present invention encompasses unshown alternatives in which lateral edges 104, 105 bounding either a clutch engagement surface or recessed area may be parallel rather than converging to a vertex, straight but neither parallel nor converging to a vertex, or curved. In any case, however, each clutch surface segment of the inventive cone clutch element (such as, for example, surface 102d of element 42a-3 in FIG. 8C) generally extends from base 78 to tip 80. At least one linear element line similar to line 71 or 72 (e.g., line 73 in FIG. 8C), which extends from base 78 to the vertex of the right circular cone defining the shape of cone clutch element 42a, will traverse the entire length of each clutch surface segment between its lateral edges 104 and 105. It may be that line 73 intersects base 78 near edge 104 and tip 80 near edge 105, or conversely, yet each embodiment of the present invention is characterized by the clutch engagement surfaces extending, in a substantially direct way, from base 78 to tip 80 of the frusto-conical surface defining element 42a.

Further, the recessed areas adjacent lateral edges 104, 105 of a given clutch engagement surface segment of the inventive cone clutch element (such as, for example, areas 103b and 103c located on either side of clutch engagement surface 102c of element 42a-3 in FIG. 8C) generally extend from base 78 to tip 80. Linear element lines similar to line 71 or 72 (e.g., lines 124 and 126 in FIG. 8C), which extend from base 78 (shown in dashed lines across areas 103b, 103c) to the vertex of the right circular cone defining the shape of element 42a, will traverse the entire length of the respective recessed area (e.g., 103b, 103c) between its bordering lateral edges 104, 105, one of those edges partially defining the next adjacent clutch element surface segment (e.g., 102b or 102d in FIG. 8C). Therefore, it is seen that clutch engagement surface segment 102c is completely contained within the cone segment defined by lines 124, 126. It may be that line 124 or 126 intersects base 78 near edge 104 and tip 80 (shown in dashed lines across areas 103b, 103c) near edge 105, or conversely, yet each embodiment of the present invention is characterized by the recessed areas between adjacent clutch engagement surfaces extending, in a substantially direct way, from base 78 to tip 80 of the frustoconical surface defining element 42a.

Referring now to FIG. 13, according to the present invention, any individual clutch engagement surface 134 may be completely contained within surface 135 of a right conic segment defined by two straight lines 136, 138 which extend from vertex 128 to circular cone base 78, intersecting the circumference of the base at points 130, 132. A characteristic common to all embodiments of element 42a is that lines 136, 138 traverse the recessed areas on opposite sides of any clutch engagement surface segment 134 without crossing surface 134. Moreover, any individual clutch engagement surface segment 134 according to the present invention may be completely contained between lines 136, 138, which intersect base 78 at points 130, 132, respectively, the radial angle δ between these points ranging from 0° to 180°.

The graph shown as FIG. 9 is the counterpart of FIG. 4, illustrating measured $T_{tot}$ and bias ratio values for given $T_{low}$ values for differential 10a as shown in FIG. 5, having two cone clutch elements 42a-3, each of which, as shown in FIGS. 8A–8C, have five clutch surface segments of equivalent size and are equally disposed about the outside surface of the element. This differential unit is otherwise identical to the unit associated with the results graphed in FIG. 4. These two differential units were subjected to the same durability test procedure. Prior to undergoing durability testing, $T_{tot}$ and bias ratio were measured for given $T_{low}$ values, the measured values represented by lines 90a and 94a, respectively. As can be seen by comparing lines 90 and 94 (FIG. 4) with lines 90a and 94a (FIG. 9), pretest performance is comparable, though slightly better, with the inventive clutches vis-a-vis the helically shaped cone clutches. Post-durability test measurements, however, indicate a substantial performance improvement with the inventive clutches, as can be seen by comparing lines 92 and 96 (FIG. 4) with lines 92a and 96a (FIG. 9). Most clearly indicated is the improvement in bias ratio durability, which can be seen by comparing lines 94 and 96 in FIG. 4 and lines 94a and 96a in FIG. 9, particularly at lower values of $T_{low}$. It is notably, too, that the shape of post-test bias ratio curve 96a conforms to pretest bias ratio curve 94a in FIG. 9, whereas a comparison of the shapes of pretest bias ratio curve 94 and post-test curve 96 indicates clutches 42 experienced significant bias ratio degradation during testing.

Figure 10:
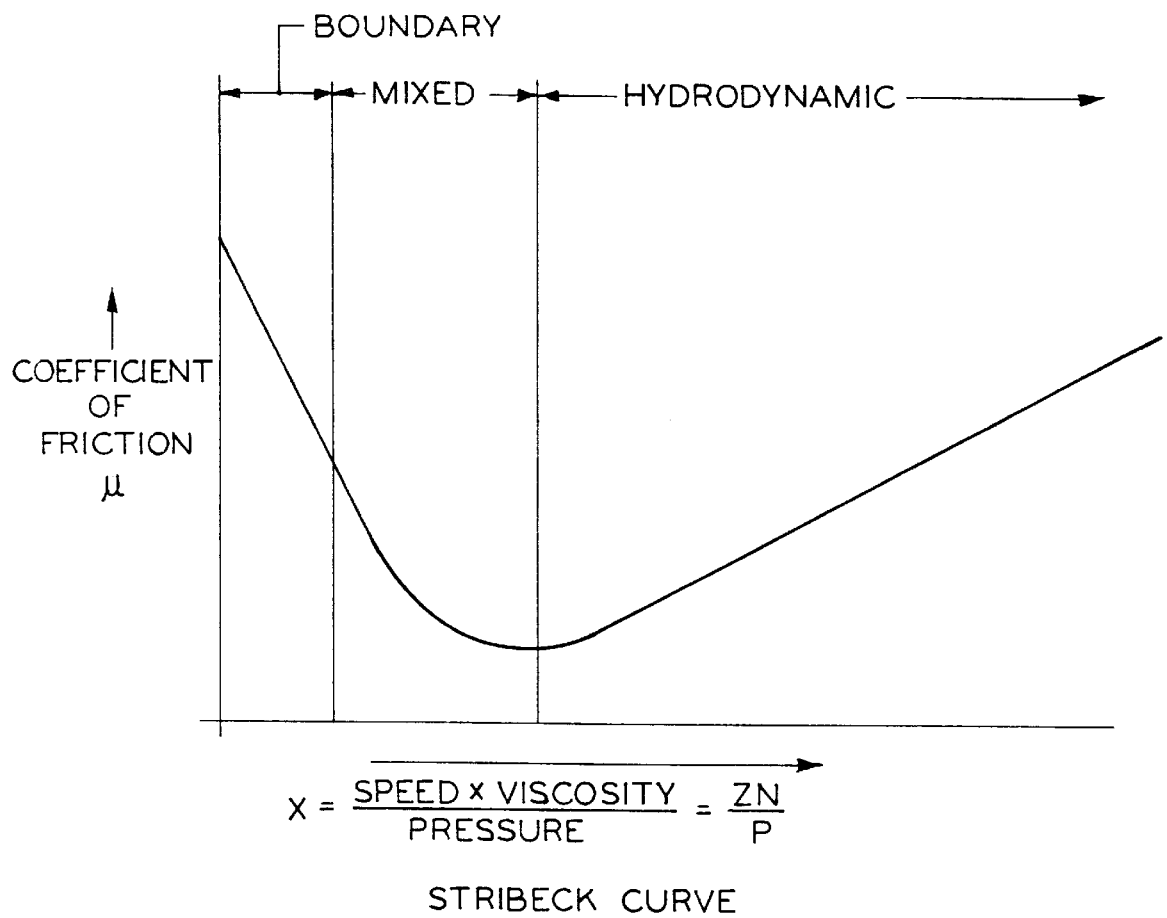
FIG. 10 is a Stribeck curve (Arthur Caines and Roger Haycock, *Automotive Lubricants Reference Book,* 31 (1996)) illustrating how the coefficient of friction between two relatively moving surfaces varies with the type of lubrication therebetween.

A possible explanation of why the inventive cone clutch elements have improved bias ratio durability vis-a-vis previous, helically shaped cone clutches may involve differences in the type of lubrication experienced between the cone clutch element and interfacing clutch seat surfaces 62, 64 of casing 20. FIG. 10 is a Stribeck Curve, which shows generally how the coefficient of friction, μ, and type of lubrication vary with the lubricant viscosity and the relative speed and pressure between the interfacing, relatively moving surfaces. Three types of lubrication are indicated at the top of FIG. 10: Boundary Lubrication, where the surface of the lubricant layer is lower than the roughness protrusions of the interfacing surfaces, which are in contact; Hydrodynamic Lubrication, where a layer of lubricant is disposed between the interfacing surfaces and prevents their direct engagement; and Mixed Lubrication, where the surface of the lubricant layer is approximately equal to the that of the roughness protrusions of the interfacing surfaces. As can be seen, μ is at its lowest value near the transition point between Mixed Lubrication and Hydrodynamic Lubrication. The Stribeck Curve also shows that the three phases of lubrication progress from Boundary Lubrication to Mixed Lubrication to Hydrodynamic Lubrication as one of relative surface speed (Z) or lubricant viscosity (N) increase or contact pressure (P) decreases, the other two variables held constant This lubrication phase sequence thus progresses with increasing values of X, where:

$$X = ZN/P \qquad \text{(Equation 2)}$$

Accordingly, FIG. 10 shows that μ reaches its highest values when X is either zero, in a pure Boundary Lubrication state (e.g., speed equals zero), or is very high, in a pure Hydrodynamic Lubrication state (e.g., P is very low).

Figure 11:
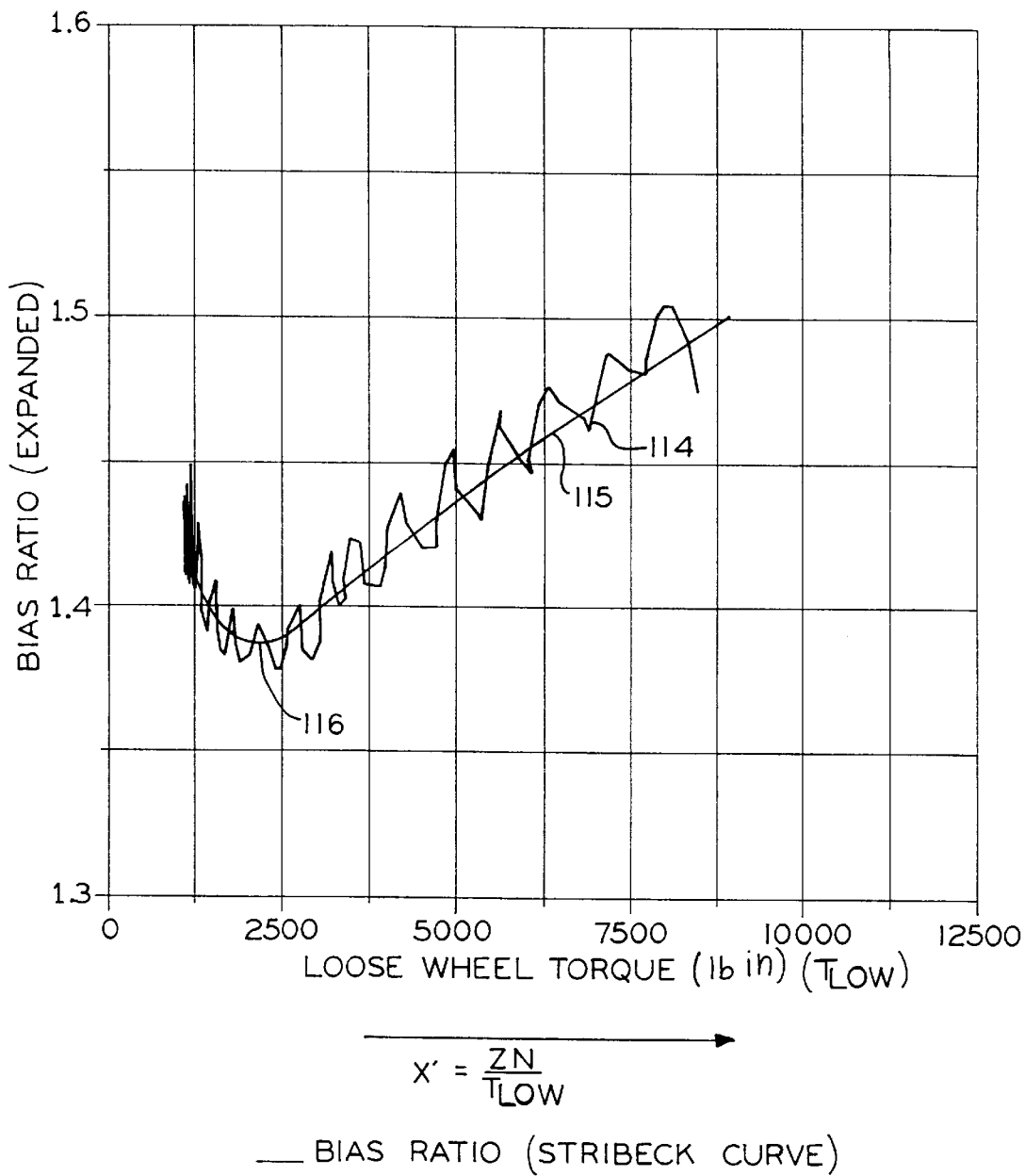
FIG. 11 is a graph illustrating the relationship between the bias ratio and the torque applied to the axle having the lower torque, for the differential of FIG. 1 without preload mechanism 54, after durability testing.

FIG. 11 is a graph similar to FIG. 4, showing post-durability test bias ratio values for given $T_{low}$ values for differential 10 of FIG. I with preload mechanism 54 removed. Thus, while FIG. 4 shows this relationship via line 96 for a complete differential, FIG. 11 shows this relationship via line 114 for the same differential with no preload on the cone clutch elements. Smoothed line 115 approximates data-generated line 114. As indicated in Equation 1, above, bias ratio is a linear function of torque. For a cone clutch element, torque (T) is a linear function of the coefficient of friction, μ, as seen in the following formula:

$$T = D_m F_a \mu / (2 \sin(\theta/2)) \qquad \text{(Equation 3a)}$$

where $D_m$ is the mean diameter of the clutch facing, $F_a$ is the axial engaging force and θ is the included angle between lines 71 and 72. Collecting terms, Equation 3a may be reexpressed as:

$$T = \mu [D_m F_a (2 \sin(\theta/2))] \qquad \text{(Equation 3b).}$$

Where $D_m$, $F_a$ and θ are held constant, Equation 3b may be reexpressed as:

$$T = \mu C \qquad \text{(Equation 3c)}$$

where C represents the constant. Therefore, it can be seen that for given clutch and axial load parameters, bias ratio, a linear function of torque according to Equation 1, is directly proportional to μ. Between cone clutch elements 42 and 42a, $D_m$ and θ are equivalent, as is $F_a$ between the tested differential units.

In performing the measurements which yield the data represented in FIG. 11, relative surface speed (Z) is held constant and lubricant viscosity (N) is assumed constant. $T_{low}$ varies directly and linearly with pressure (P) and so Equation 2 can be re-expressed as:

$$X' = ZN/T_{low} \qquad \text{(Equation 4)}$$

where X' is directly proportional to X.

Thus, it is postulated that line 115 in FIG. 11 represents a form of reverse Stribeck curve, where X' increases with lower values of $T_{low}$. Under this premise, for constant values of speed and viscosity, and increasing values of $T_{low}$, FIG. 11 shows the type of lubrication transitioning from Hydrodynamic Lubrication to Mixed Lubrication to Boundary Lubrication, with lowest bias ratio value 116, and thus the lowest $\mu$ value, occurring when $T_{low}$ is approximately 2000 pound inches.

Figure 12:
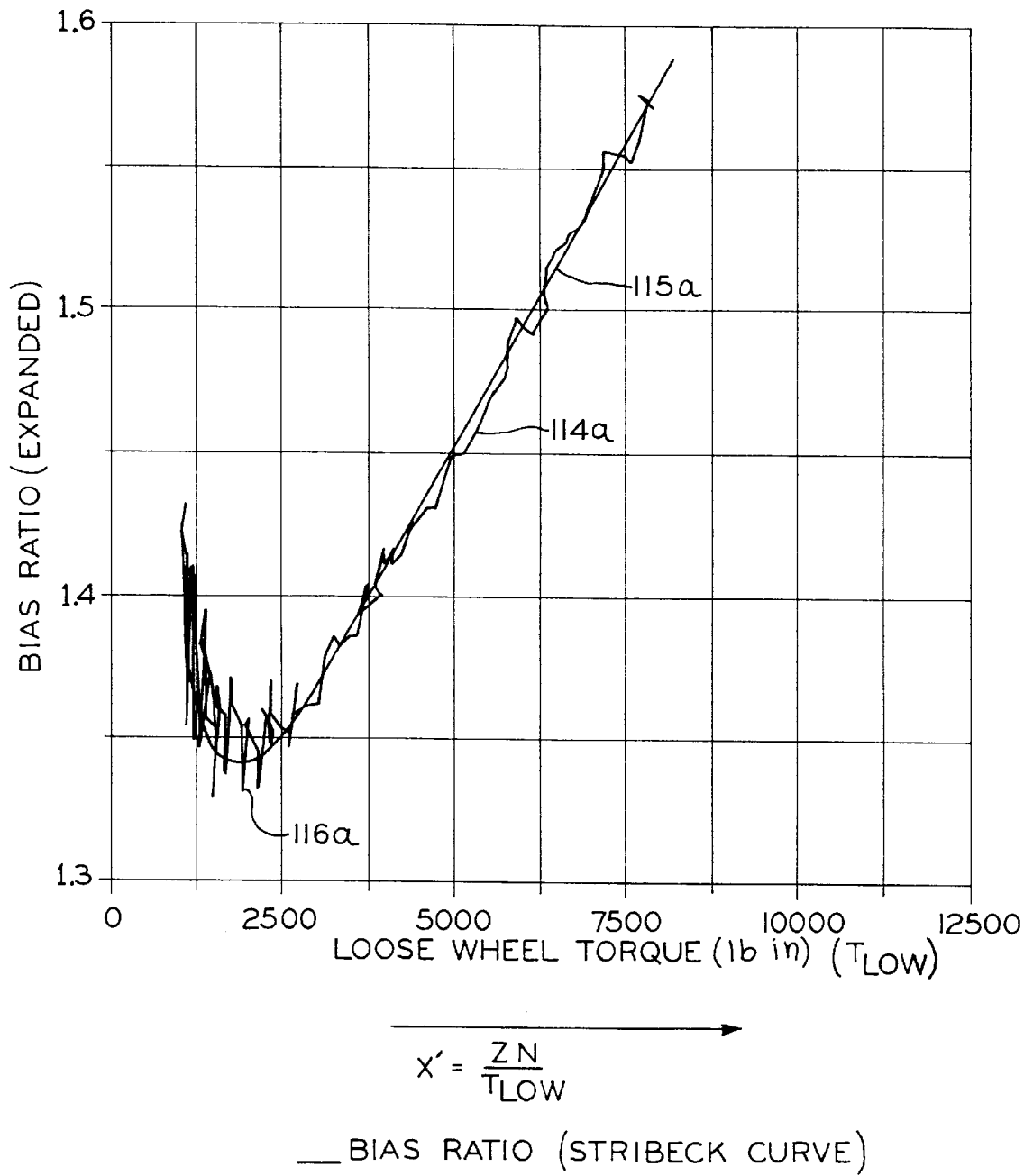
FIG. 12 is a graph illustrating the relationship between the bias ratio and the torque applied to the axle having the lower torque, for the differential of FIG. 5 without preload mechanism 54 and having two frusto-conical clutch elements as shown in FIGS. 8A–8C, after durability testing.

The graph shown as FIG. 12 is the counterpart of FIG. 11, illustrating post-durability test bias ratio values for given $T_{low}$ values for differential 10a of FIG. 5 with preload mechanism 54 removed. As in the case of comparing FIGS. 4 and 11 for the differential of FIG. 1, while FIG. 9 shows the relationship between $T_{low}$ and the bias ratio via line 96a for the complete differential of FIG. 5, FIG. 12 shows this relationship via line 114a for that differential with no preload on the cone clutch elements. Smoothed line 115a approximates data-generated line 114a. Direct comparison of line 115 of FIG. 11 and line 115a of FIG. 12 shows the slope of line 115a is much more aggressive in approaching and departing lowest bias ratio value 116a, which suggests that as $T_{low}$ changes, the inventive cone transitions faster through the Mixed Lubrication/Hydrodynamic Lubrication phase change, where $\mu$ is at a minimum.

While this invention has been described as having exemplary designs, the present invention may be further modified within the spirit and scope of this disclosure. Therefore, this application is intended to cover any variations, uses, or adaptations of the invention using its general principals. Further, this application is intended to cover such departures from the present disclosure as come within known or customary practice in the art to which this invention pertains.

What is claimed is:

1. A limited slip differential comprising:
   a pair of axles rotatable about a first axis;
   a casing rotatable about said first axis;
   at least one planet gear rotatable about an axis perpendicular to said first axis, said at least one planet gear revolving about said first axis;
   a pair of side gears intermeshed with said at least one planet gear, each of said side gears rotatably fixed relative to one of said axles;
   and
   a clutch element rotatably fixed relative to one of said side gears at all times during operation of the differential and disposed between the one of said axles to which said one side gear is rotatably fixed and said casing, said clutch element comprising a plurality of clutch engagement surfaces lying on a frusto-conical surface defined by a right circular cone having a vertex and a circular base, each of said clutch engagement surfaces bounded by at least one lateral edge, each of said clutch engagement surfaces completely contained within a surface of a right conic sector defined by two lines extending from said vertex to said circular base, said sector extending through an angle in the range of 0° to 180° about said base, said clutch element operable to frictionally engage said one axle and said casing.

2. The differential of claim 1, including three said clutch engagement surfaces.

3. The differential of claim 1, including four said clutch engagement surfaces.

4. The differential of claim 1, including five said clutch engagement surfaces.

5. The differential of claim 1, wherein said clutch engagement surfaces are separated from each other by recessed areas.

6. The differential of claim 5, wherein each of said recessed areas are located between lateral edges of two of said plurality of clutch engagement surfaces.

7. The differential of claim 5, wherein said clutch element further comprises a transition surface which extends from said at least one lateral edge bounding each of said clutch engagement surfaces to an adjacent one of said recessed areas.

8. The differential of claim 7, wherein said transition surface is concave.

9. The differential of claim 7, wherein said transition surface is flat.

10. The differential of claim 5, wherein said recessed areas each include substantially equal surface area.

11. The differential of claim 5, wherein the total surface area of said clutch engagement surfaces is substantially equal to the total surface area of said recessed areas.

12. The differential of claim 1, wherein said frusto-conical surface comprises a base and a tip.

13. The differential of claim 12, wherein said lateral edges extend from said base to said tip.

14. The differential of claim 1, wherein said clutch engagement surfaces are evenly distributed about said clutch element.

15. The differential of claim 1, wherein two lines disposed radially opposite one another on said right circular cone define an included cone angle at said vertex in the range of 10° to 25°.

16. A rigid cone clutch element for a limited slip differential, comprising:
   a plurality of clutch engagement surfaces lying on a frusto-conical surface defined by a right circular cone having a vertex and a circular base, each of said clutch engagement surfaces bounded by at least one lateral edge, each of said clutch engagement surfaces completely contained within a right conic surface sector defined by two lines extending from said vertex to said circular base, said sector extending less than 180° about the base and not containing any portions of the other clutch engagement surfaces.

17. The clutch element of claim 16, further comprising recessed areas interposed between said clutch engagement surfaces.

18. The clutch element of claim 17, wherein said clutch engagement surfaces and said recessed areas are substantially evenly distributed about said frusto-conical surface.

19. The clutch element of claim 17, further comprising a transition surface extending between each of said lateral edges and an adjacent said recessed surface.

20. The clutch element of claim 19, wherein said transition surface is concave.

21. The clutch element of claim 19, wherein said transition surface is flat.

22. The clutch element of claim 17, wherein said recessed areas are disposed approximately 0.040 inch below said clutch engagement surfaces.

23. The clutch element of claim 17, wherein said frusto-conical surface comprises a base and a tip, said clutch engagement surfaces and said recessed areas extending from said base to said tip.

24. The clutch element of claim 16, wherein lines disposed on each of said clutch engagement surfaces converge to form the vertex of a right circular cone.

25. The clutch element of claim 24, wherein two lines located radially opposite one another on said right circular cone define an included cone angle at said vertex in the range of 10° to 25°.

26. The clutch element of claim 16, including three said clutch engagement surfaces.

27. The clutch element of claim 16, including four said clutch engagement surfaces.

28. The clutch element of claim 16, including five said clutch engagement surfaces.

29. The clutch element of claim 16 wherein lines disposed along two adjacent said lateral edges are parallel.

30. A limited slip differential comprising:

a pair of axles rotatable about a first axis;

a casing rotatable about said first axis;

at least one planet gear rotatable about an axis perpendicular to said first axis, said at least one planet gear revolving about said first axis;

a pair of side gears intermeshed with said at least one planet gear, each of said side gears rotatably fixed relative to one of said axles;

and a generally frusto-conical clutch element defined by a right circular cone having a base and a vertex, said clutch element disposed between one of said side gears and said casing for fictionally engaging said one side gear and said casing, said clutch element rotatably fixed relative to said one side gear at all times during operation of the differential, said clutch element comprising a plurality of discrete clutch engagement surfaces separated by nonengagement portions, said clutch engagement surfaces and said nonengagement portions generally arranged to extend from said base in the direction of said vertex.

31. A limited slip differential comprising:

a pair of axles rotatable about a first axis;

a casing rotatable about said first axis;

at least one planet gear rotatable about an axis perpendicular to said first axis, said at least one planet gear revolving about said first axis;

a pair of side gears intermeshed with said at least one planet gear, each of said side gears rotatably fixed relative to one of said axles;

and a clutch element disposed between one of said axles and said casing, said clutch element rotatably fixed at all times during operation of the differential relative to the one of said side gears which is rotatably fixed to said one axle, said clutch element comprising a plurality of clutch engagement surfaces lying on a frusto-conical surface defined by a right circular cone having a base and a vertex, each of said clutch engagement surfaces bounded by lateral edges, a line extending from said base to said vertex in one of said clutch engagement surfaces disposed between at least two of said lateral edges of said one clutch engagement surface, said clutch element operable to frictionally engage said one axle and said casing.

* * * * *